(12) United States Patent
Wang et al.

(10) Patent No.: US 8,070,147 B2
(45) Date of Patent: Dec. 6, 2011

(54) CLAMPING DEVICE

(75) Inventors: Chiung-Hung Wang, Taipei Hsien (TW); Chao-Chien Lee, Taipei Hsien (TW); Jen-Hui Wang, Taipei Hsien (TW); Chiu-Yi Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 669 days.

(21) Appl. No.: 12/238,409

(22) Filed: Sep. 25, 2008

(65) Prior Publication Data
US 2009/0278297 A1    Nov. 12, 2009

(30) Foreign Application Priority Data

May 9, 2008   (CN) .......................... 2008 1 0301508

(51) Int. Cl.
*B25B 1/06*     (2006.01)
*B25B 5/12*     (2006.01)

(52) U.S. Cl. ....................................... 269/216; 269/228
(58) Field of Classification Search ............... 269/216, 269/218, 228, 229, 25, 903
See application file for complete search history.

(56) References Cited

U.S. PATENT DOCUMENTS

| | | | |
|---|---|---|---|
| 1,600,747 A * | 9/1926 | Yurkovitch | 188/65.1 |
| 2,743,631 A * | 5/1956 | MacChesney | 269/216 |
| 4,728,137 A * | 3/1988 | Hamed et al. | 269/228 |
| 6,929,255 B2 * | 8/2005 | Hwang | 269/25 |
| 2008/0169595 A1 * | 7/2008 | Li et al. | 269/216 |

FOREIGN PATENT DOCUMENTS

GB         2082654 A         3/1982

* cited by examiner

*Primary Examiner* — Hadi Shakeri
(74) *Attorney, Agent, or Firm* — Altis Law Group, Inc.

(57) ABSTRACT

A clamping device includes a securing seat, a driving member movably mounted on the securing seat, a first fixture, a second fixture, a first securing pole, a second securing pole, a first joining member and a second joining member. The first fixture includes a first clamping member and a first connecting member. The first connecting member comprises a first moving portion. The second fixture includes a second clamping member and a second connecting member. The second connecting member includes a second moving portion. The first and second securing poles are fixed on the securing seat. The first and second joining members are respectively matched with the first and second securing poles. Two ends of the first joining member are respectively connected to the driving member and the first moving portion. Two ends of the second joining member are respectively connected to the driving member and the second moving portion.

17 Claims, 9 Drawing Sheets

CLAMPING DEVICE

BACKGROUND

1. Field of the Invention

The invention relates to clamping devices and, particularly, to a clamping device for clamping a portable device.

2. Description of the Related Art

Portable devices such as digital cameras, mobile telephones, and personal digital assistants need to be tested prior to being sold or used in order to ensure quality thereof. When a portable device is about to be tested, the portable device needs to be secured via a clamping device. The portable device may, for example, be secured on a battery simulator. The clamping device generally comprises a clamping handle and two positioning blocks mounted on the clamping handle. The portable device can be secured between the two positioning blocks. However, it is difficult to firmly clamp the portable device due to its single handle structure. Moreover, the edge of the portable device is prone to break due to uneven force applied thereon by the single handle.

Therefore, it is desirable to provide a clamping device for clamping a portable device which can overcome the above-mentioned problem.

DETAILED DESCRIPTION OF THE EMBODIMENTS

Figure 1:
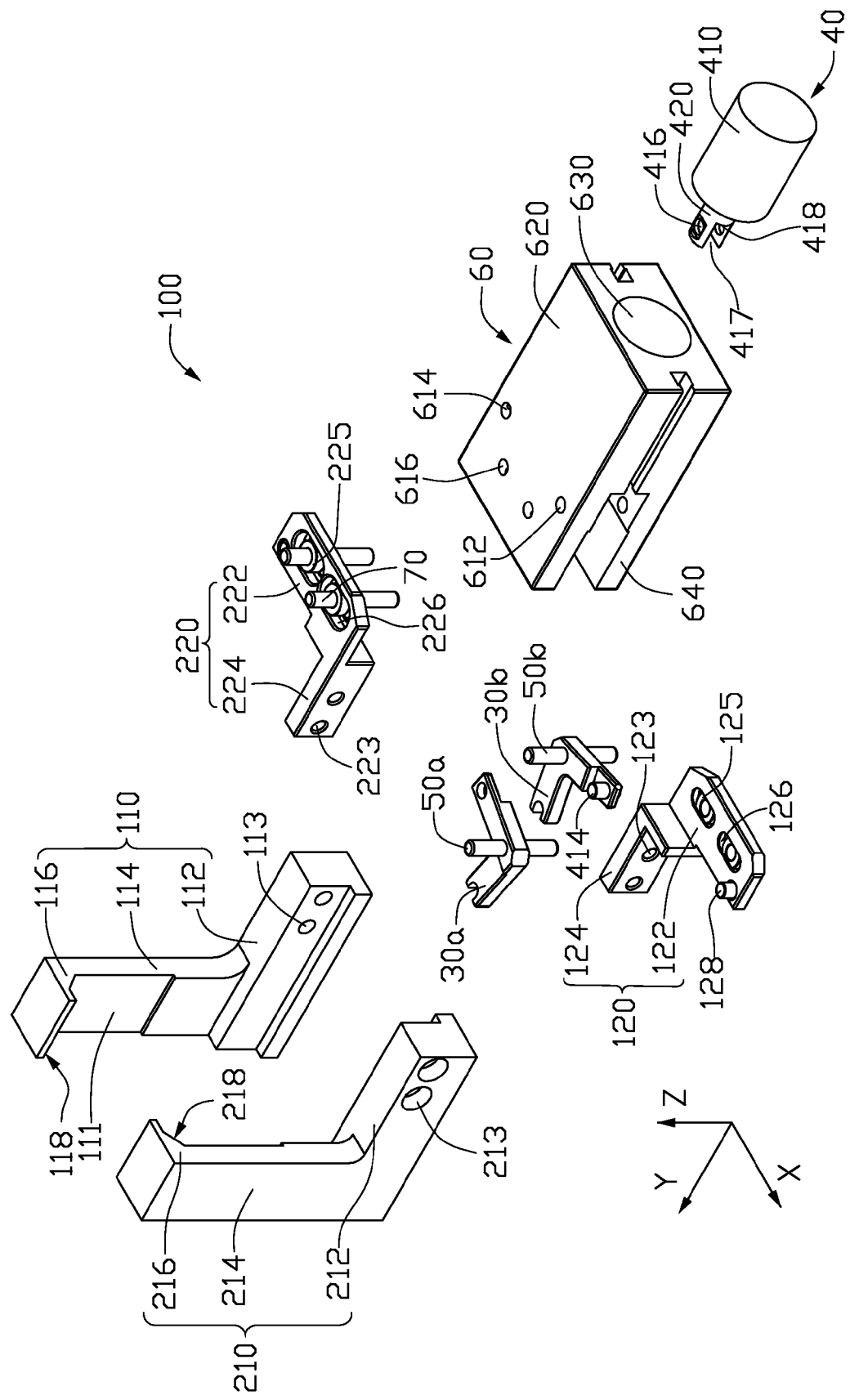
FIG. 1 is a schematic isometric view of a disassembled clamping device having a first joining member, a second joining member, a second connecting member and a securing seat, according to an exemplary embodiment.

Embodiments of the present invention will now be described in detail with references to the accompanying drawings.

Referring to FIGS. 1-6, a clamping device 100 according to an exemplary embodiment includes a first fixture 10, a second fixture 20, a first joining member 30a, a second joining member 30b, a driving member 40, a first securing pole 50a, a second securing pole 50b, a securing seat 60 and two third securing poles 70. The driving member 40 is movably mounted on the securing seat 60. The two third securing poles 70 join the first fixture 10 to the second fixture 20. The first securing pole 50a and the second securing pole 50b are fixed on the securing seat 60 and are symmetrical about the driving member 40. The first joining member 30a and the second joining member 30b match with the first securing pole 50a and the second securing pole 50b, respectively. The first securing pole 50a, the second securing pole 50b and the two third securing poles 70 are fixed on the securing seat 60.

The first fixture 10 includes a first clamping member 110 and a first connecting member 120. The first connecting member 120 is connected to the first clamping member 110.

Referring to FIG. 1, the first clamping member 110 includes a first base 112, a first main body 114 and a first clipping block 116. The first main body 114 extends from the first base 112 and is substantially perpendicular to the first base 112. The first main body 114 of the clamping member 110 has a clamping surface 111. The first base 112 defines two first screw holes 113 thereon. The first clipping block 116 is formed on one end of the first main body 114 far away from the first base 112. The first clipping block 116 has a moderately inclined plane 118 facing the first base 112. In this embodiment, the gradient of the moderately inclined plane 118 diminishes slowly in a direction near the first base 112. In this embodiment, the first base 112, the first main body 114 and the first clipping block 116 are integrally formed.

The first connecting member 120 includes a first moving portion 122 and a first linking portion 124. The first linking portion 124 extends from one end of the first moving portion 122 along a Y direction and is perpendicular to the first moving portion 122. The first moving portion 122 defines two first guiding holes 126 and includes two first washers 125 and a first protruding post 128. The first washers 125 are received in the first guiding holes 126 and are configured to match with the third securing pole 70. The first protruding post 128 extends from another end of the first moving portion 122 along a Z direction, which is perpendicular to the Y direction.

In this embodiment, the first linking portion 124 is L-shaped and defines two second screw holes 123 corresponding to the first screw holes 113. The first linking portion 124 is secured to the first base 112 of the clamping member 110 via a bolt (not shown) inserted through the corresponding first and second screw holes 113 and 123 and being secured via a nut (not shown).

Furthermore, the first linking portion 124 can be secured to the first base 112 through various methods, such as attachment via screws or glue. Alternatively, the first connecting member 120 is integrally formed with the first clamping member 110.

The second fixture 20 includes a second clamping member 210 and a second connecting member 220. The second connecting member 220 is connected to the second clamping member 210.

The second clamping member 210 includes a second base 212, a second main body 214 and a second clipping block 216. The second main body 214 extends from the second base 212 and is substantially perpendicular to the second base 212. The clamping surface 111 of the first main body 114 faces the second main body 214 of the clamping member 210. The second base 212 defines two third screw holes 213 thereon. The second clipping block 216 is formed on one end of the second main body 214 and is far away from the second base 212. The second clipping block 216 has a moderately inclined plane 218 facing the second base 212. In this embodiment, the gradient of the moderately inclined plane 218 diminishes slowly in a direction near the second base 212. In this embodiment, the second base 212, the second main body 214 and the second clipping block 216 are integrally formed.

Figure 2:
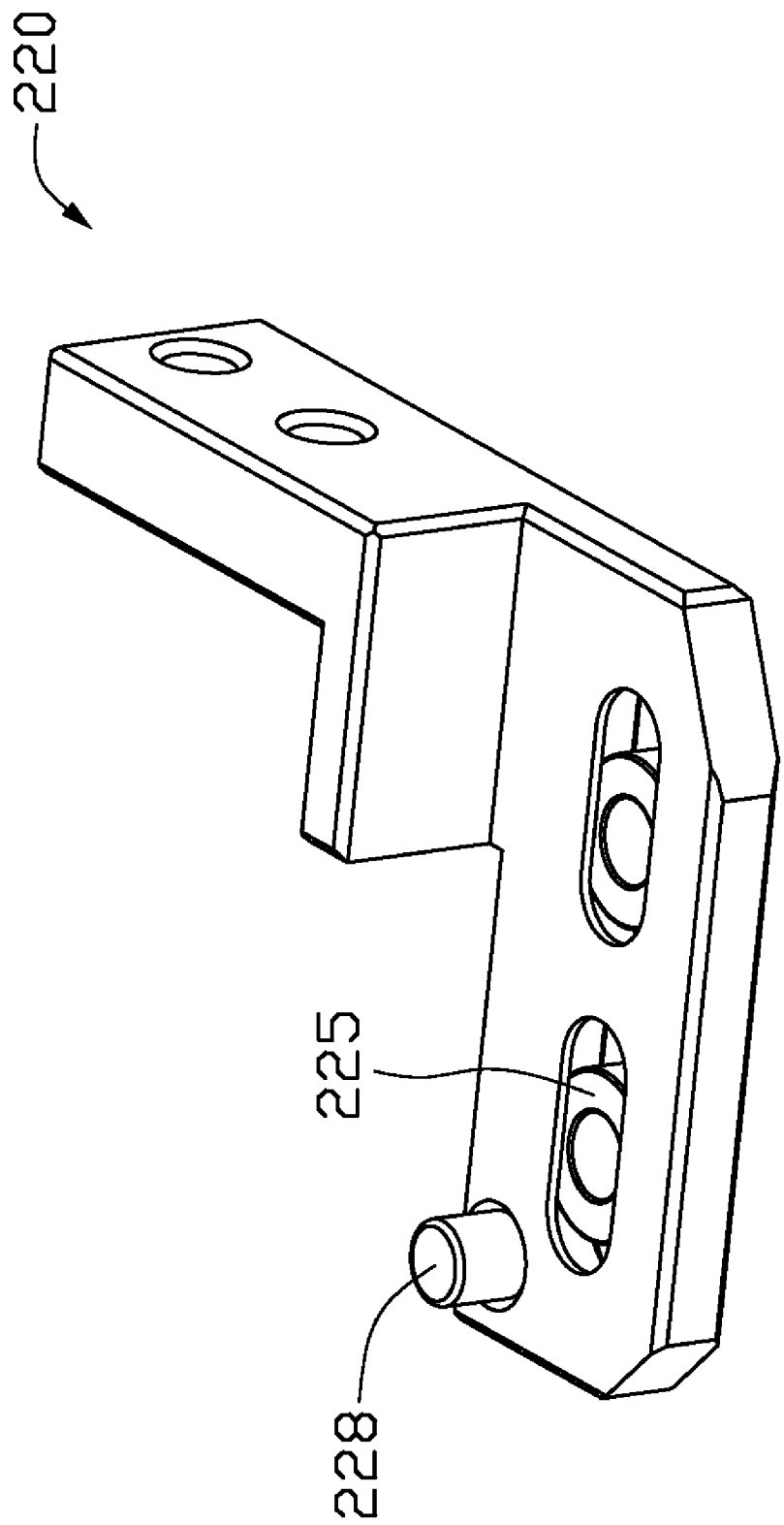
FIG. 2 is an isometric view of the second connecting member viewed from another aspect shown in FIG. 1.

Referring to FIG. 1 and FIG. 2, the second connecting member 220 includes a second moving portion 222, which corresponds to the first moving portion 122, and a second linking portion 224. The second linking portion 224 extends from one end of the second moving portion 222 along the Y direction and is perpendicular to the second moving portion 222. The second moving portion 222 defines two second guiding holes 226 corresponding to the first guiding hole 126 and includes two second washers 225 and a second protruding post 228. The second washers 225 are received in the second guiding holes 226 and are configured to match with the third securing pole 70. The second protruding post 228 extends from another end of the second moving portion 222 along the Z direction.

In this embodiment, the second linking portion 224 is L-shaped and defines two fourth screw holes 223 corresponding to the third screw holes 213. The second linking portion 224 is secured to the second base 212 of the second clamping member 210 via a bolt (not shown) respectively inserted through the corresponding third and the fourth screw holes 213 and 223 and being secured via a nut (not shown).

Furthermore, the second linking portion 224 can be secured to the second base 212 through various methods, such as attachment via screws or glue. Alternatively, the second connecting member 220 is integrally formed with the second clamping member 210.

Figure 3:
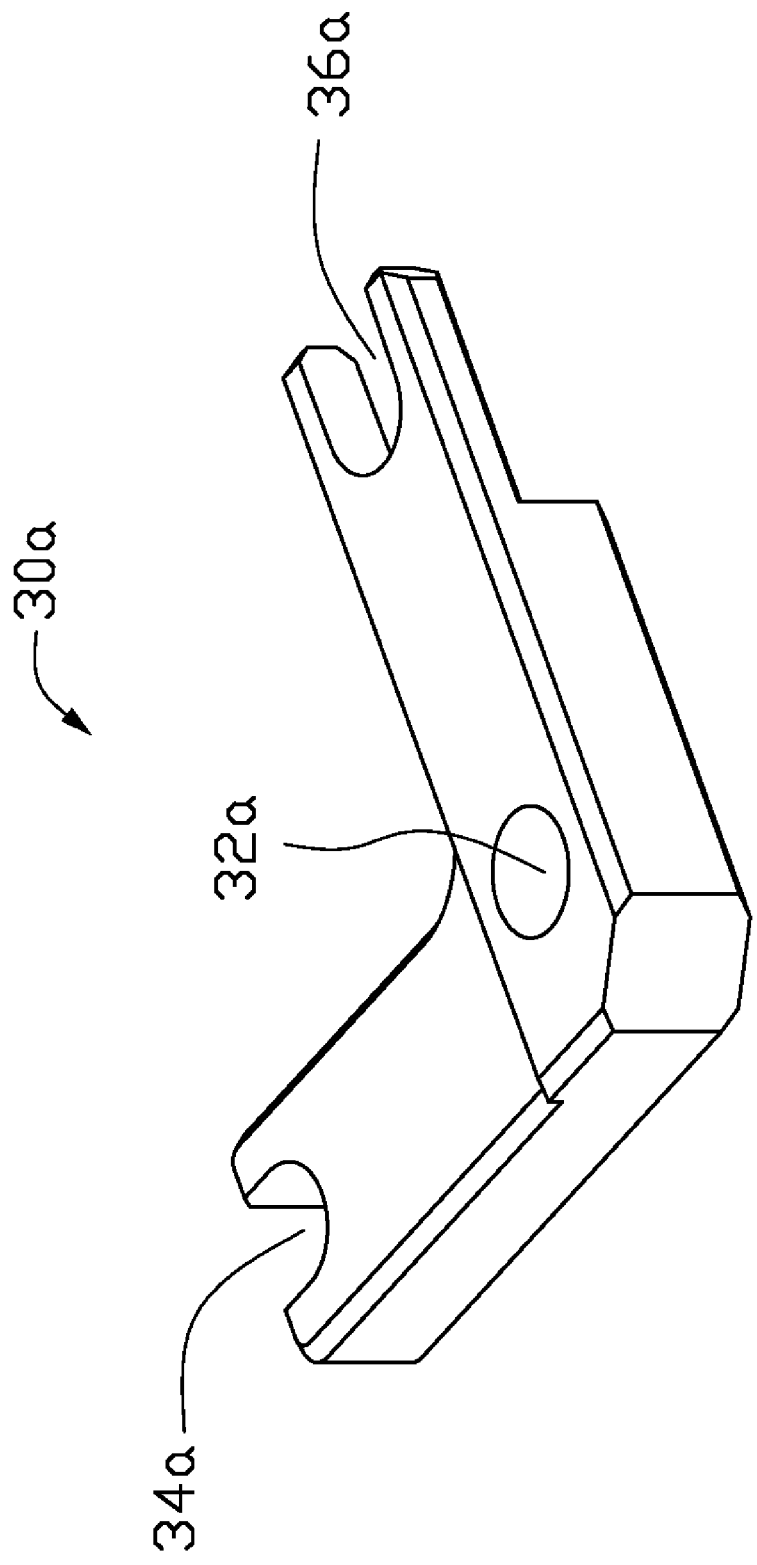
FIG. 3 is an isometric view of the first joining member shown in FIG. 1.

Referring to FIG. 3, the first joining member 30a is V-shaped and defines a first through hole 32a on the middle portion thereof corresponding to the first securing pole 50a. Furthermore, the first joining member 30a defines a first and second unshaped groove 34a and 36a on two ends thereof. The first protruding pole 128 of the first moving portion 122 is matched with the first unshaped groove 34a for moveably joining the first joining member 30a and the first moving portion 122.

Figure 4:
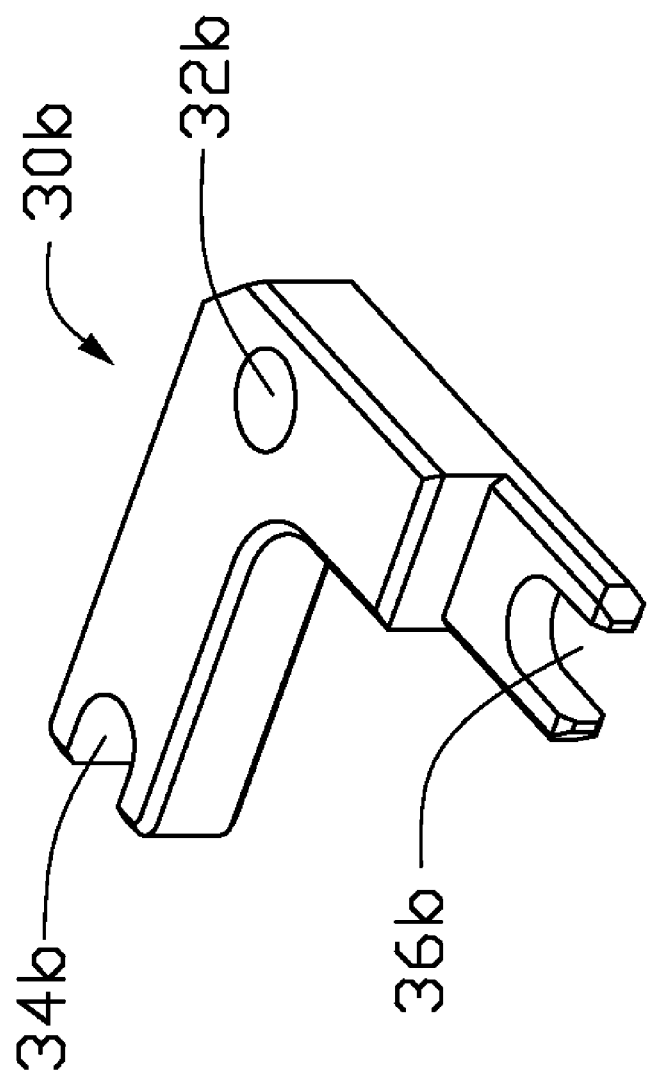
FIG. 4 is an isometric view of the second joining member shown in FIG. 1.

Referring to FIG. 4, the second joining member 30b is V-shaped and defines a second through hole 32b on the middle portion thereof corresponding to the second securing pole 50b. Furthermore, the second joining member 30b defines a third and fourth unshaped groove 34b and 36b. The second securing pole 228 of the second moving portion 222 is matched with the third unshaped groove 34b for moveably joining the second joining member 30b and the second moving portion 222. The second u-shaped groove 36a is aligned with the fourth u-shaped groove 36b.

Figure 5:
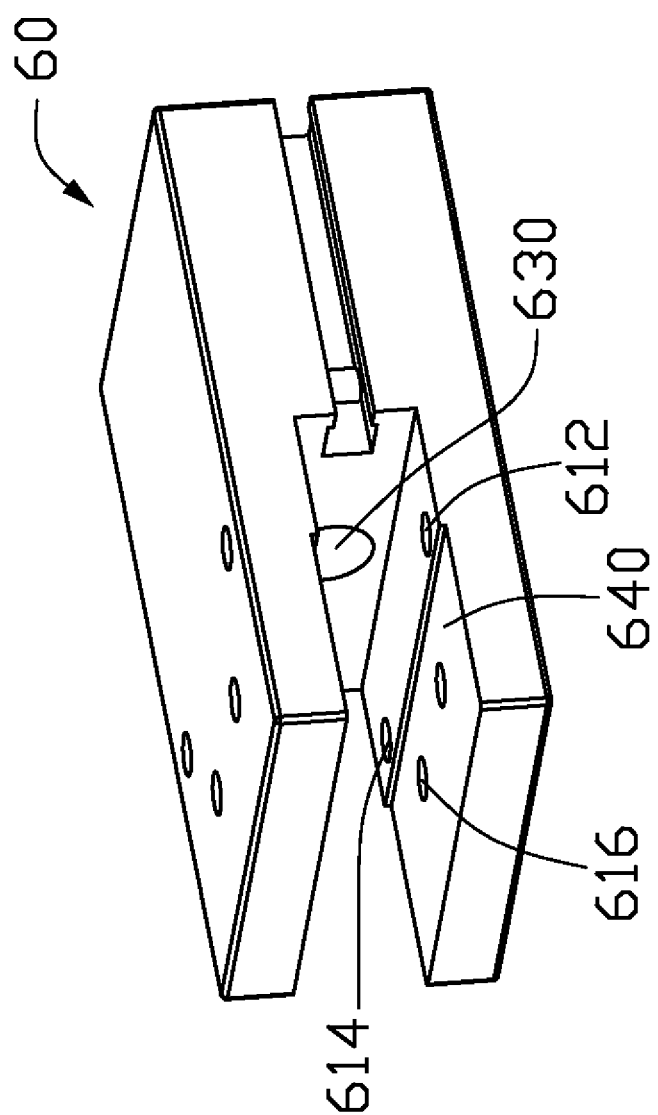
FIG. 5 is an isometric view of the securing seat shown in FIG. 1.

Referring to FIG. 1 and FIG. 5, the securing seat 60 defines a first groove 640 and the bottom wall of the first groove 640 defines a third through hole 630. Two side walls of the first groove 640 respectively define a first securing hole 612, a second securing hole 614 and two third securing holes 616. The first moving portion 122, the second moving portion 222, the first joining member 30a and the second joining member 30b are received in the first groove 640.

The two end of the first securing pole 50a are inserted through the first securing holes 612 in order to become fixed on the securing seat 60. The two ends of the second securing pole 50b are inserted through the second securing holes 614 in order to be mounted on the securing seat 60.

Each third securing pole 70 is matched with two washers and two corresponding guiding holes. For example, the first and second washer 125, 225 are matched with the corresponding first and second guiding hole 126, 226. The two ends of each third securing pole 70 are respectively inserted in the third securing hole 616 in order to be mounted on the securing seat 60. A line between the two third securing poles 70 is perpendicular to the clamping surface 111.

The driving member 40 includes an actuator 410 and a driving shaft 420. The actuator 410 is received in the third through hole 630 and is capable of moving relative to the securing seat 60 and actuating the driving shaft 420 to move relative to the securing seat 60. The driving shaft 420 defines a second groove 417 for matching with the first joining member 30a and the second joining member 30b. Two side walls of the second groove 417 respectively defines a fourth through hole 416 and a fifth through hole 418 in alignment, thereby allowing a thin object to simultaneously penetrate both through holes. The fourth through hole 416 is opposite to the fifth through hole 418. In this embodiment, the actuator 410 is a push-pull piston.

Referring to FIGS. 1-3, a bolt 414 respectively inserts through the fourth through hole 416 and the second unshaped groove 36a for moveably joining the first joining member 30a to the driving member 410. Meanwhile, the Bolt 414 respectively inserts through fourth u-shaped groove 36b and the fifth through hole 418 for moveably joining the second joining member 30b to the driving member 40.

Referring to FIG. 1, FIG. 4 and FIG. 5, when the clamping device 100 has been assembled, the actuator 420 of the driving member 40 is inserted through the third through hole 630 and received in the first groove 640. The second unshaped groove 36a of the first joining member 30a and the fourth unshaped groove 36b of the second joining member 30b are received in the second groove 417.

The first moving portion 122 is located on one side wall of the first groove 640. The first guiding holes 126 are aligned with the corresponding third securing hole 616. The first moving portion 122 of the first connecting member 120 is moveably connected to the first joining member 30a via the first protruding pole 128 of the first moving portion 122, which matches with the first unshaped groove 34a of the first joining member 30a.

The second moving portion 222 of the second connecting member 220 is received in the first groove 640 and located on the first moving portion 122 of the first connecting member 120. The second moving portion 222 is moveably connected to the second joining member 30b via the second protruding pole 228 of the second joining member 30b, which matches with the second unshaped groove 34b of the second joining member 30b. Therefore, the first moving portion 122, the second moving portion 222, the first joining member 30a and the second joining member 30b are received in the first groove 640.

The securing poles 70 are respectively inserted through the third securing hole 616, the first guiding hole 126 and the corresponding first washer 125, and the second guiding hole 226 and the corresponding second washer 225, and fixed firmly on the securing seat 60.

The bolt 414 is respectively inserted through the fourth through hole 416, the second u-shaped groove 36a, the third u-shaped groove 34b and the fifth through hole 418 to match with the driving shaft 410 via a nut (not shown). As a result, the first joining member 30a and the second joining member 30b are movably connected to the driving member 40 via the bolt 414.

A bolt (not shown) is inserted through the first screw hole 113 and the second screw hole 123 to secure the first clamping member 110 to the first connecting member 120 via a nut (not shown). Accordingly, another bolt (not shown) is inserted through the third screw hole 213 and the fourth screw hole 223 to secure the second clamping member 210 to the second connecting member 220 via a nut (not shown).

Figure 6:
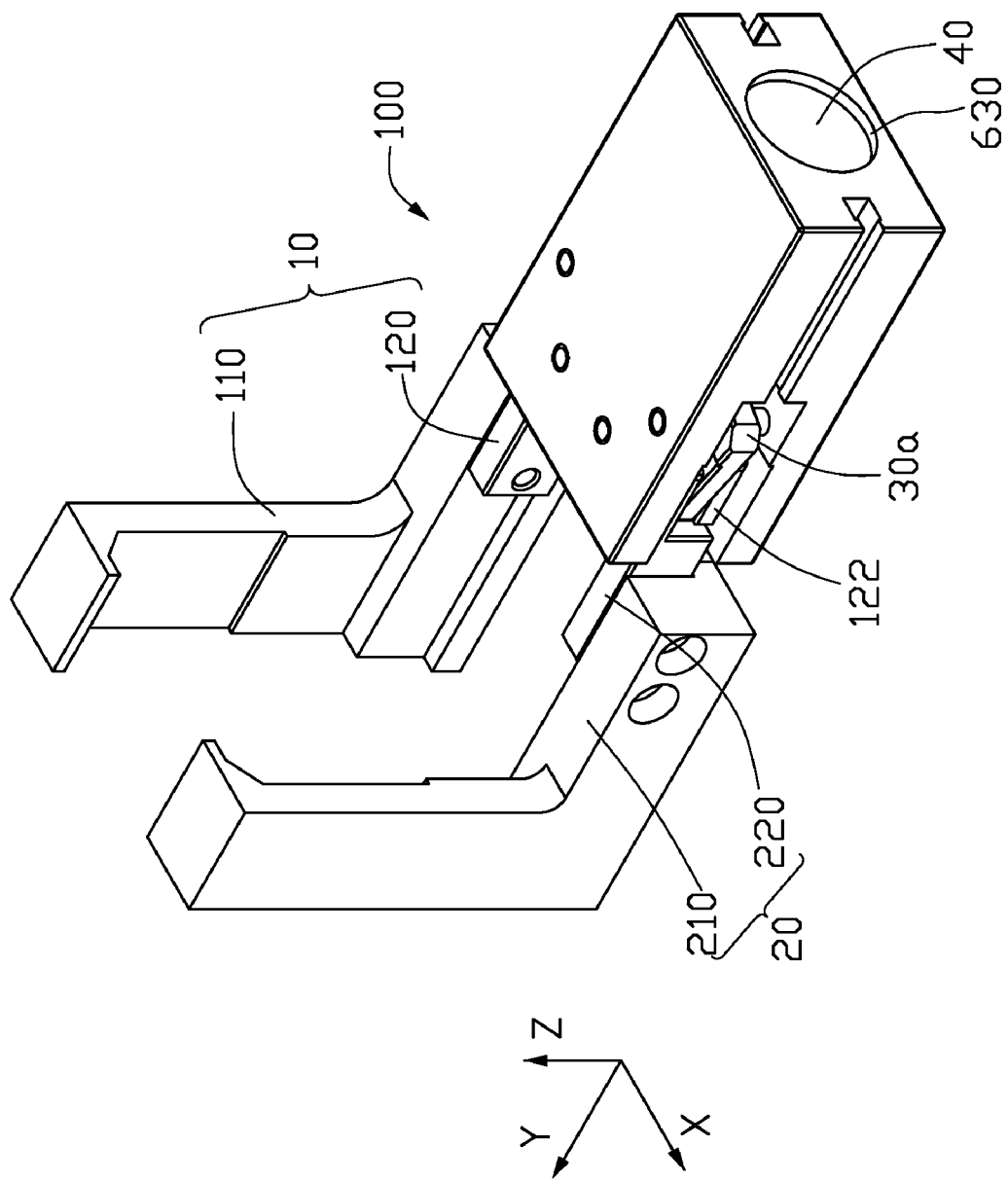
FIG. 6 is a schematic assembled view of the clamping device in FIG. 1.
Figure 7:
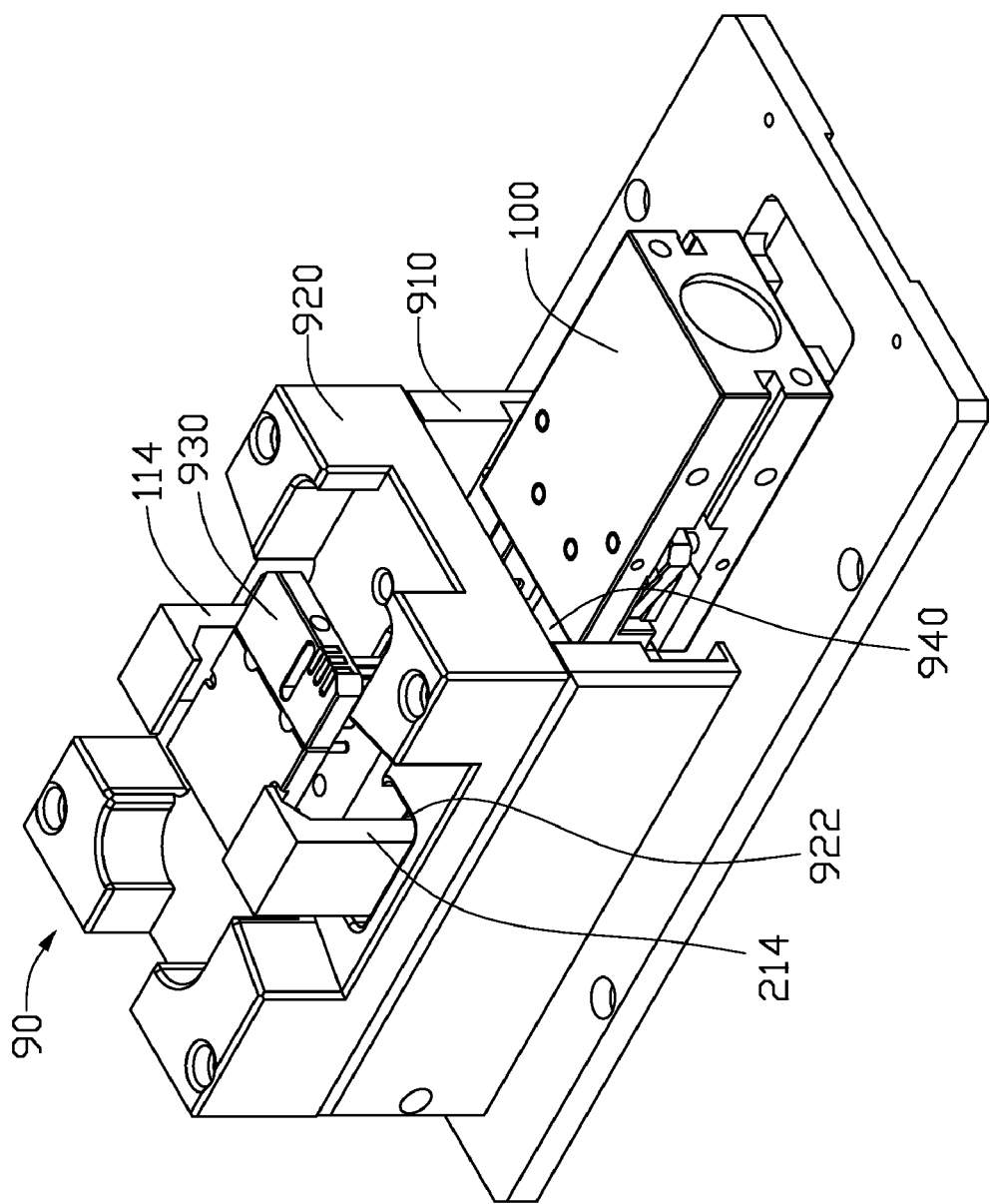
FIG. 7 is a schematic isometric view of the clamping device in FIG. 1 installed in a station.
Figure 8:
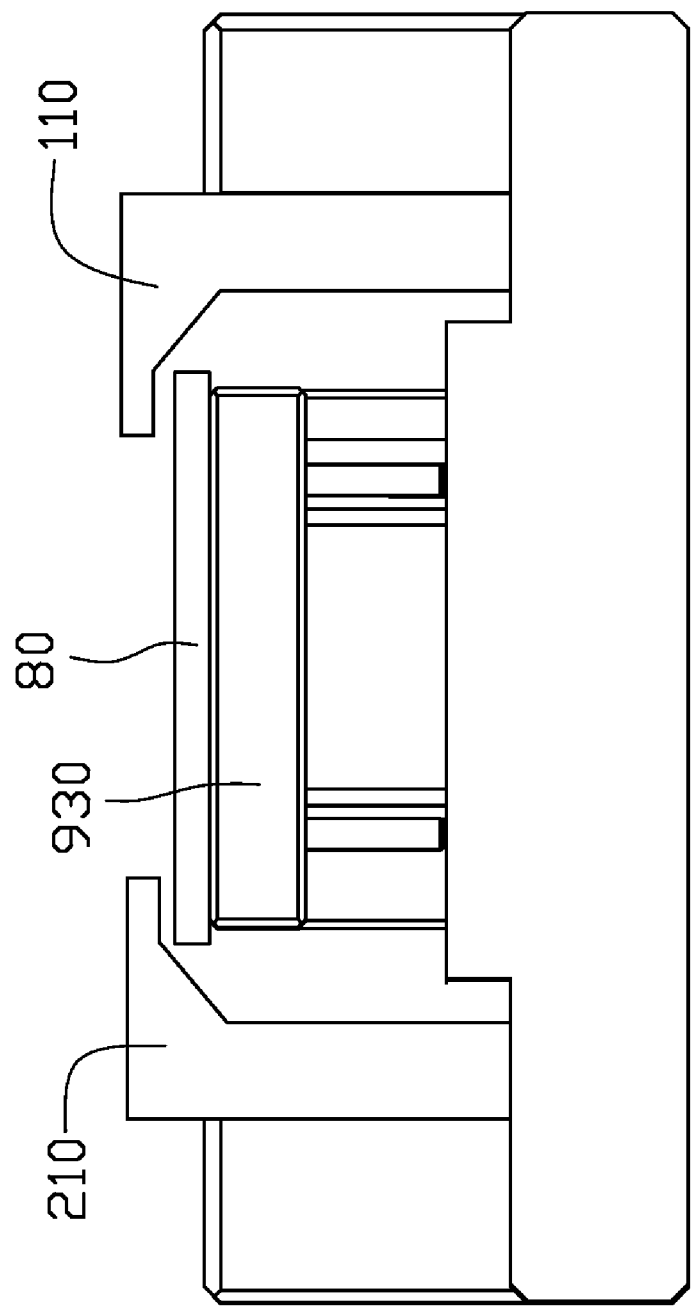
FIG. 8 is a plane view of a loosening state of the clamping device shown in FIG. 1.

Referring to FIG. 6 and FIG. 8, the clamping device 100 is used to clamp a portable electronic device. In this embodiment, the clamping device 100 clamps a mobile telephone 80 (as shown in FIG. 7). Under normal circumstances, the clamping device 100 is mounted on a station 90. The station 90 includes two poles 910 facing each other, a supporting station 920 and a battery simulator 930. The supporting station 920 defines two sixth through holes 922 and is supported by the two poles 910 to form a receiving space 940. The battery-simulator 930 is placed on the supporting station 920. The mobile telephone 80 is placed on the battery simulator 930. The clamping device 100 is received in the receiving space 940 with the first main body 114 and the second main body 214 respectively extending out from the receiving space 940 through the sixth through hole 922, for clamping the mobile telephone 80.

Figure 9:
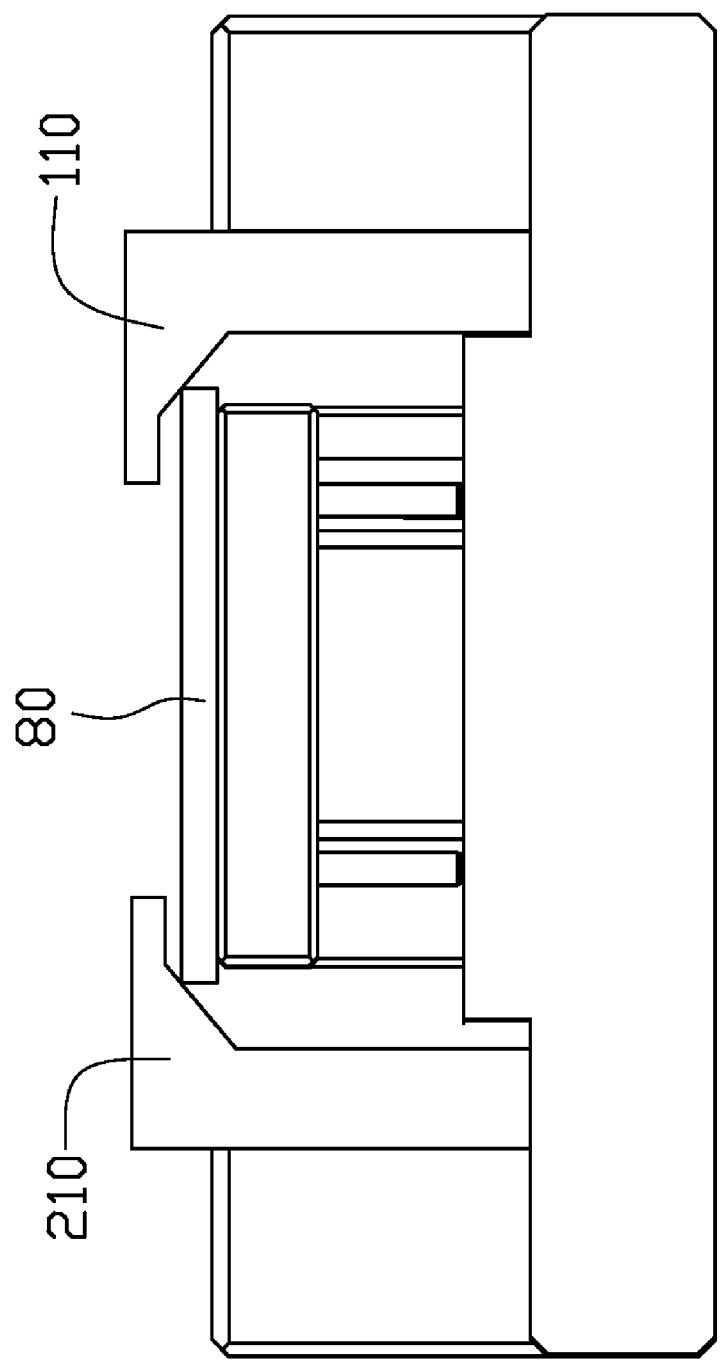
FIG. 9 is a plane view of a clamping state of the clamping device shown in FIG. 1.

Referring to FIG. 8, the clamping device 100 is in a loosening state. A gap is defined between the mobile telephone 80 and the first and second clamping members 110, 210. Referring to FIG. 9, the clamping device 100 is in a clamping state. The first clamping member 110 and the second clamping member 210 are moved towards the movable telephone 80 to clamp the mobile telephone 80.

Referring to FIG. 1 and FIG. 6, when the actuator 420 drives the driving shaft 410 to move along the Y-direction, the driving shaft 410 drives one end of the first joining member 30a to rotate counter-clockwise around the first securing pole 50a, while the other end of the first joining member 30a drives the first moving portion 122 to rotate counter-clockwise. Because the securing poles 70 matches with the first guiding holes 126, the first moving portion 122 of the first connecting member 120 move along the X-direction. The first moving portion 122 drives the first clamping member 110 to move via the first linking portion 124 along the X-direction.

Meanwhile, the driving shaft 410 drives one end of the second joining member 30b to rotate clockwise around the second securing pole 50b, while the other end of the second joining member 30b drives the second moving portion 222 to rotate clockwise. Because the securing poles 70 match with the second guiding holes 226, the second moving portion 222 of the second connecting member 220 move along a reverse X-direction. The second moving portion 222 drives the second clamping member 210 to move via the second linking portion 224 along the reverse X-direction. Lastly, the clamping device 100 has completed the clamping process.

When the actuator 420 drives the driving shaft 410 to move in a reverse Y-direction, the driving shaft 410 drives one end of the first joining member 30a to rotate clockwise around the first securing pole 50a, while the other end of the first joining member 30a drives the first moving portion 122 to rotate clockwise. Because the securing poles 70 match with the first guiding holes 126, the first moving portion 122 of the first connecting member 120 move along the reverse X-direction. The first moving portion 122 drives the first clamping member 110 to move via the first linking portion 124 along the reverse X-direction.

Meanwhile, the driving shaft 410 drives one end of the second joining member 30b to rotate counter-clockwise around the second securing pole 50b, while the other end of the second joining member 30b drives the second moving portion 222 to rotate counter-clockwise. Because the securing poles 70 match with the second guiding holes 226, the second moving portion 222 of the second connecting member 220 move along the X-direction. The second moving portion 222 drives the second clamping member 210 to move via the second linking portion 224 along the X-direction.

The clamping device 100 simultaneously drive the first clamping member 110 and the second clamping member 210 to move inward or outward relative to each other for clamping or loosening. Therefore, the clamping device 100 can prevent the border of the portal device from breaking due to different forces being applied thereon.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A clamping device comprising:
a securing seat defining a first groove, a bottom wall of the first groove defines a through hole;
a driving member movably mounted on the securing seat, the driving member comprising an actuator and a driving shaft, the actuator being capable of moving relative to the securing seat and actuating the driving shaft to move relative to the securing seat, the actuator received in the through hole;
a first fixture comprising a first clamping member and a first connecting member connected to the first clamping member, the connecting member comprising a first moving portion supported by the securing seat;
a second fixture comprising a second clamping member facing the first clamping member and a second connecting member connected to the second clamping member, the second connecting member comprising a second moving portion facing the first moving portion;
a first securing pole and a second securing pole fixed on the securing seat and symmetrically positioned about the driving member;
a first joining member and a second joining member respectively matched with the first securing pole and the second securing pole and being capable of rotating around thereto, two ends of the first joining member respectively connected to the driving member and the first moving portion, two ends of the second joining member respectively connected to the driving member and the second moving portion;
and two third securing poles;
wherein the driving shaft, the first joining member, the second joining member, the first moving portion and the second moving portion are received in the first groove, the first moving portion defines two first guiding holes, the first moving portion comprises two first washers, the first washers are received in the first guiding holes, the second moving portion defines two second guiding holes, the second moving portion comprises two second washers, the second washers are received in the second guiding holes, each of the third securing poles is respectively inserted through one of the first washers, one of the first guiding holes, a respective one of the second washers and a respective one of the second guiding holes to be secured to two side walls of the first groove.

2. The clamping device as claimed in claim 1, wherein the first joining member defines a first through hole on the middle portion thereof corresponding to the first securing pole, the second joining member defines a second through hole on the middle portion thereof corresponding to the second securing pole, the first securing pole and the second securing pole are respectively inserted through the first through hole and the second through hole to be fixed on the securing seat.

3. The clamping device as claimed in claim 1, further comprising a bolt, wherein the first joining member respectively defines a first u-shaped groove and a third u-shaped groove, the first moving portion comprises a first protruding post, the first protruding post is matched with the first u-shaped groove for movably joining the first moving portion to the first joining member, the driving shaft defines a second groove, one side wall of the second groove defines a fourth through hole, the bolt is respectively inserted through the fourth through hole and the third u-shaped groove for movably joining the first joining member to the driving member.

4. The clamping device as claimed in claim 3, wherein the second joining member respectively defines a second u-shaped groove and a fourth u-shaped groove, the second moving portion comprises a second protruding post, the second protruding post is matched with the second u-shaped groove for movably joining the second joining member to the second moving portion, another side wall of the first groove defines a fifth through hole corresponding to the fourth through hole, the bolt is respectively inserted through the fifth through hole and the fourth u-shaped groove for movably joining the second joining member to the driving member.

5. The clamping device as claimed in claim 1, wherein the first clamping member comprises a first base, a first main body and a first clipping block, the first main body extends from the first base along a direction that is substantially perpendicular to the first base, the first clipping block is formed on one end of the first main body far away from the first base.

6. The clamping device as claimed in claim 5, wherein the first main body of the clamping member comprises a clamping surface facing the second clamping member.

7. The clamping device as claimed in claim 5, wherein the first clipping block comprises a moderate inclined plane facing the first base, the gradient of the moderate inclined plane diminishes slowly in a direction near the first base.

8. The clamping device as claimed in claim 5, wherein the first connecting member is secured to the first base of the first clamping member.

9. The clamping device as claimed in claim 5, wherein the first connecting member further comprises a first linking portion connected to the first clamping member, the first linking portion extends from one end of the first moving portion along a direction near the first base, the first linking portion is substantially perpendicular to the first moving portion.

10. The clamping device as claimed in claim 9, wherein the first linking portion is L-shaped.

11. The clamping device as claimed in claim 5, wherein the second clamping member comprises a second base facing the first main body, a second main body and a second clipping block, the second main body extends from the second base along a direction that is substantially perpendicular to the second base, the second clipping block is formed on one end of the second main body far away from the second base.

12. The clamping device as claimed in claim 11, wherein the second clipping block comprises a moderate inclined plane facing the second base, the gradient of the moderate inclined plane diminishes slowly in a direction near the second base.

13. The clamping device as claimed in claim 12, wherein the second connecting member is secured to the second base of the second clamping member.

14. The clamping device as claimed in claim 12, wherein the second connecting member further comprises a second linking portion, the second linking portion extends from one end of the second moving portion along a direction near the second base, the second linking portion is substantially perpendicular to the second moving portion, the second linking portion is secured to the second base of the second clamping member.

15. The clamping device as claimed in claim 1, wherein the first joining member and the second joining member are V-shaped.

16. A device for clamping an electronic device on a testing station, comprising:
    a securing seat disposed on said testing station, and defining a first groove, a bottom wall of the first groove defines a through hole;
    a driving member movably assembled in said securing seat, the driving member comprising an actuator and a driving shaft, the actuator being capable of moving relative to the securing seat and actuating the driving shaft to move relative to the securing seat, the actuator received in the through hole;
    a first fixture comprising a first clamping member and a first connecting member extending from said first clamping member and having a first moving portion to be movably assembled with said driving member in said securing seat; and
    a second fixture spaced from said first fixture to allow that said electronic device to be clamped is placed between said first and second fixtures, said second fixture comprising a second clamping member facing said first clamping member and a second connecting member extending from said second clamping member and having a second moving portion facing the first moving portion to be movably assembled with said driving member in said securing seat, said first and second clamping members moving toward each other along a first moving line to clamp said electronic device therebetween on said testing station when said driving member moves along a second moving line different from said first moving line to simultaneously drive movement of said first and second clamping members via said first and second connecting members respectively,
    a first securing pole and a second securing pole fixed on the securing seat and symmetrically positioned about the driving member;
    a first joining member and the second joining member respectively matched with the first securing pole and the second securing pole and being capable of rotating around thereto, two ends of the first joining member respectively connected to the driving member and the first moving portion, two ends of the second joining member respectively connected to the driving member and the second moving portion: and
    two third securing poles;
    wherein the driving shaft, the first joining member, the second joining member, the first moving portion and the second moving portion are received in the first groove, the first moving portion defines two first guiding holes, the first moving portion comprises two first washers, the first washers are received in the first guiding holes, the second moving portion defines two second guiding holes, the second moving portion comprises two second washers, the second washers are received in the second guiding holes, each of the third securing poles is respectively inserted through one of the first washers, one of the first guiding holes, a respective one of the second washers and a respective one of the second guiding holes to be secured to two side walls of the first groove.

17. A device for clamping an electronic device on a testing station, comprising:
    a securing seat disposed on said testing station, and defining a first groove, a bottom wall of the first groove defines a through hole;
    a driving member movably assembled in said securing seat, the driving member comprising an actuator and a driving shaft, the actuator being capable of moving relative to the securing seat and actuating the driving shaft to move relative to the securing seat, the actuator received in the through hole;

a first fixture comprising a first clamping member and a first connecting member extending from said first clamping member and having a first moving portion to be movably assembled with said driving member in said securing seat; and a second fixture spaced from said first fixture to allow that said electronic device to be clamped is placed between said first and second fixtures, said second fixture comprising a second clamping member facing said first clamping member and a second connecting member extending from said second clamping member and having a second moving portion facing the first moving portion to be movably assembled with said driving member in said securing seat, said first and second connecting members being juxtaposed in said securing seat and moved oppositely when said driving member simultaneously drives said first and second clamping members to clamp said electronic device therebetween on said testing station via said first and second connecting members respectively, a first securing pole and a second securing pole fixed on the securing seat and symmetrically positioned about the driving member;

a first joining member and the second joining member respectively matched with the first securing pole and the second securing pole and being capable of rotating around thereto, two ends of the first joining member respectively connected to the driving member and the first moving portion, two ends of the second joining member respectively connected to the driving member and the second moving portion: and two third securing poles;

wherein the driving shaft, the first joining member, the second joining member, the first moving portion and the second moving portion are received in the first groove, the first moving portion defines two first guiding holes, the first moving portion comprises two first washers, the first washers are received in the first guiding holes, the second moving portion defines two second guiding holes, the second moving portion comprises two second washers, the second washers are received in the second guiding holes, each of the third securing poles is respectively inserted through one of the first washers, one of the first guiding holes, a respective one of the second washers and a respective one of the second guiding holes to be secured to two side walls of the first groove.

* * * * *